COSINUSOIDALLY DISTRIBUTED MICROWAVE IMPEDANCE TRANSFORMER

Filed Feb. 4, 1964 2 Sheets-Sheet 1

INVENTOR.
DANIEL J. KENNEALLY
BY Wade Koontz and Martin J. Finnegan
ATTORNEYS

COSINUSOIDALLY DISTRIBUTED MICROWAVE IMPEDANCE TRANSFORMER

Filed Feb. 4, 1964 2 Sheets-Sheet 2

INVENTOR.
DANIEL J. KENNEALLY
BY
Wade Koontz and Martin J. Finnegan
ATTORNEYS 3,323,082

COSINUSOIDALLY DISTRIBUTED MICROWAVE IMPEDANCE TRANSFORMER

Daniel J. Kenneally, Rome, N.Y., assignor to the United States of America as represented by the Secretary of the Air Force Filed Feb. 4, 1964, Ser. No. 342,575
2 Claims. (Cl. 333—34)

The invention described herein may be manufactured and used by or for the United States Government for governmental purposes without payment to me of any royalty thereon.

This invention relates to microwave impedance transformers, and more particularly to a cosinusoidal distributed impedance transformer for the matching of two RF transmission lines with different characteristic impedances.

Hitherto, the matching of two transmission lines has been accomplished by the insertion of a suitable coupling circuit that provides a reflectionless matching junction and therefore maximum power transfer. The matching network has the reciprocal property of mathematically transforming the characteristic impedance presented at one terminal into the characteristic impedance of the other terminal. Physically, a propagating wave from one transmission line incident at one terminal is transmitted through the coupling circuit without reflection to the other transmission line.

In addition, the coupling circuit must perform satisfactorily over the entire operating bandwidth dictated by the overall system function.

This invention is concerned with a continuously distributed impedance transformer, in particular, a cosinusoidal impedance distribution. Design techniques based on the cosinusoidal transformation process offer significant improvement in overall transformer circuit performance compared to other methods. Impedance transformers designed with cosinusoidal impedance matching provide large frequency bandwidths for a fixed physical length, and conversely, shorter physical lengths for a fixed frequency bandwidth, which is superior to the exponential, Bessel, linear, or hyperbolic tangent conventional transformers.

It is therefore one object of the present invention to provide an impedance matching technique which will provide superior circuit performance in terms of a minimum reflection coefficient over a maximum bandwidth for a given length of transformer.

It is another object of this invention to provide a generalized radio frequency matching tehcnique that permits great flexibility in design parameters and is mathematically simple to calculate.

Figure 1:
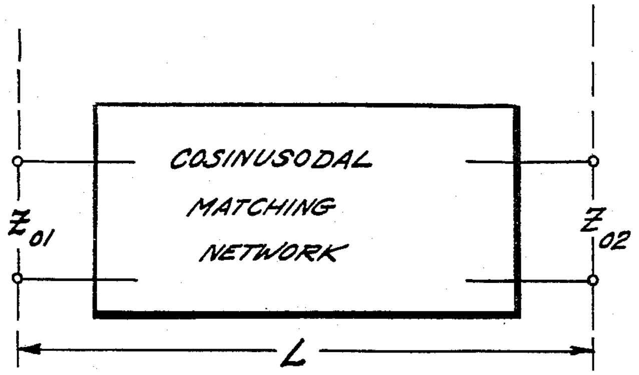
Figure 2:
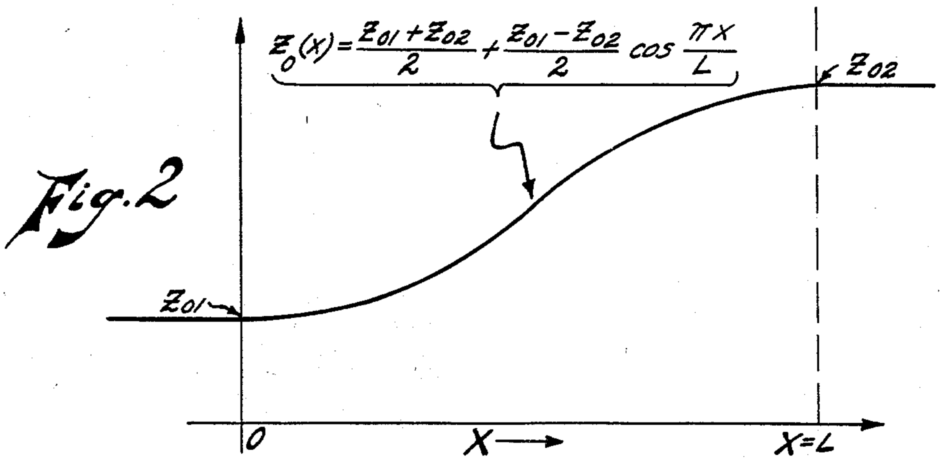
Figure 3:
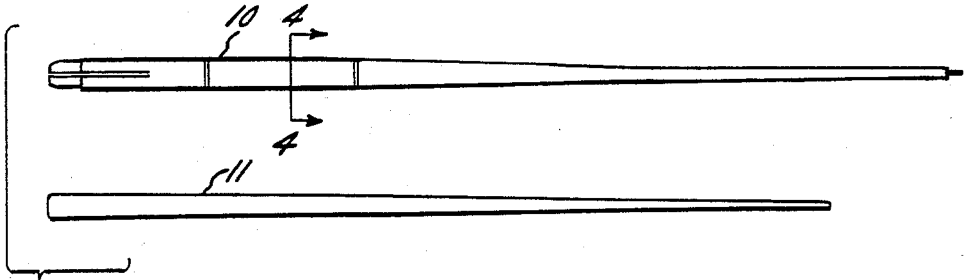
Figure 4:
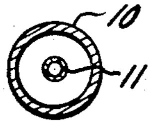
Figure 5A:
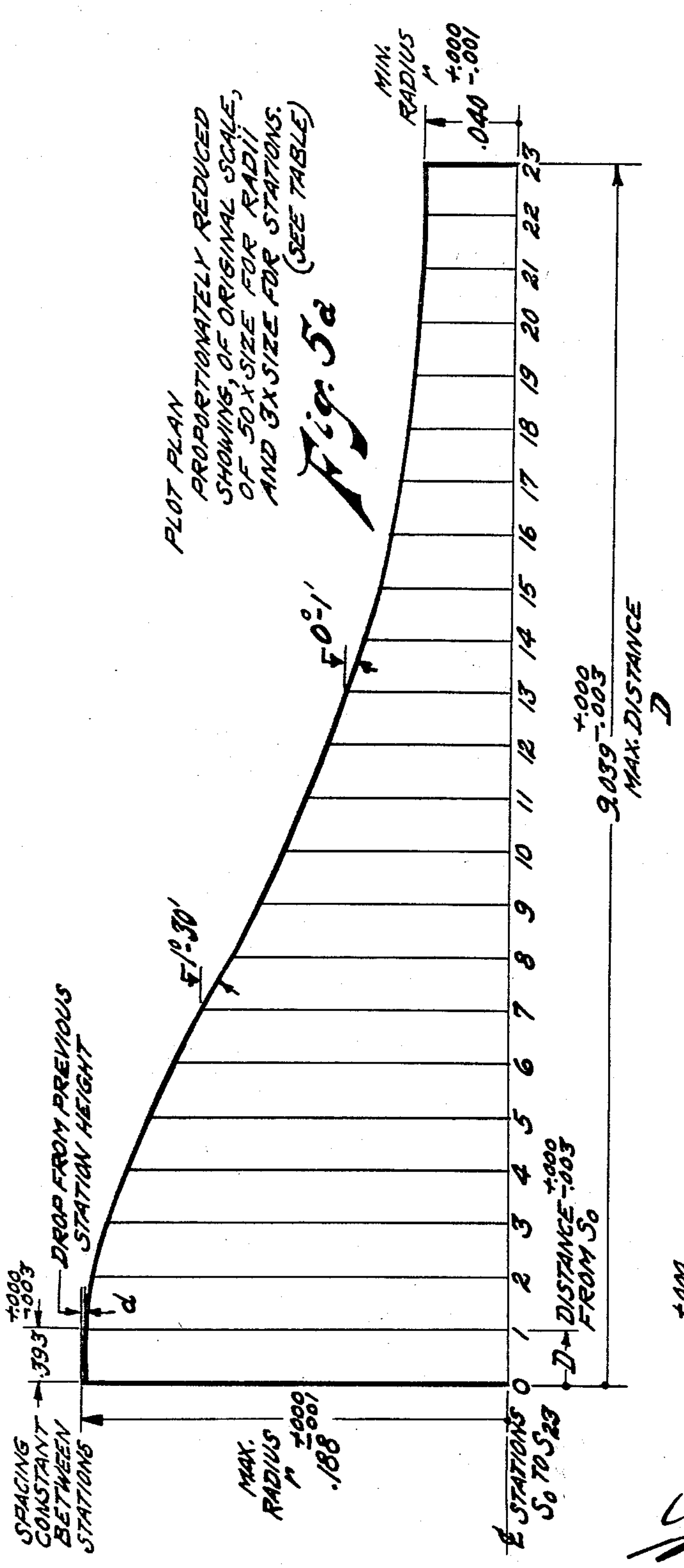
Figures 5B, 5C:
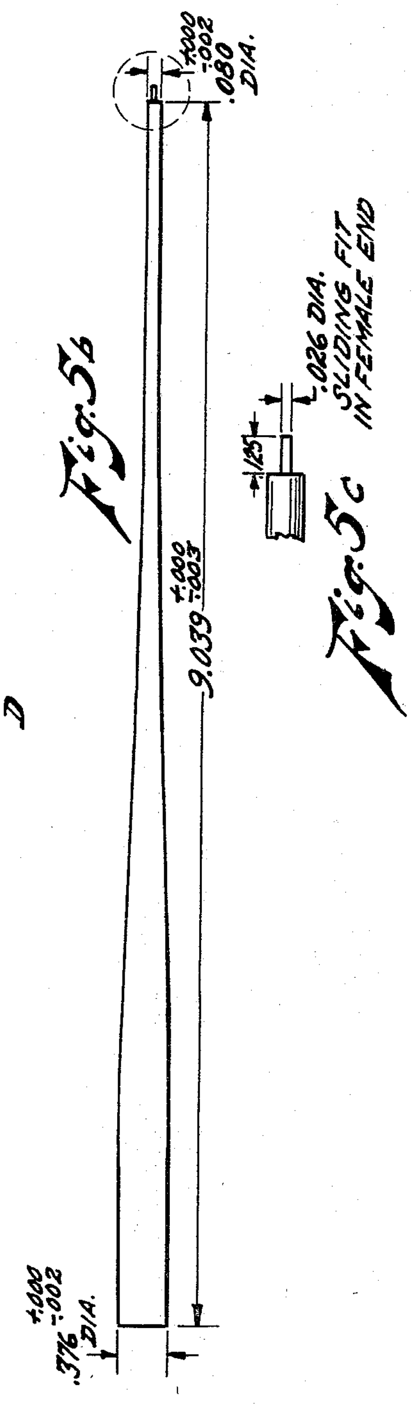

The invention will be further described in connection with the accommpanying drawings in which:

FIG. 1 shows a diagram which is helpful in understanding the invention; FIG. 2 shows the plot of the impedance distribution as it would develop in the practice of the herein-disclosed invention; FIG. 3 shows a profile of the conductors involved; FIG. 4 is a cross-sectional view along the line 4—4 of FIG. 3; FIGS. *5a* and *5b* constitute mathematical presentations of the progressive variation in radial dimensions along the length of the conductors; and FIG. *5c* is an elevation view of the terminal section of the conductor.

The object of all problems of impedance matching is to effect the transformation of one impedance into another by the use of a suitable network. Consider two uniform transmission lines of characteristic impedances equal to $Z_{01}$ and $Z_{02}$ ohms, respectively. These lines are to be coupled together through a reflectionless junction employing a section of non-uniform transmission line known as a taper. The tapered section which is the subject of this invention is characterized by the fact that its characteristic impedance is an explicit cosinusoidal mathematical function of the direction of propagation for the transverse electromagnetic mode. FIGS. 1 and 2 show the schematic of the problem and the impedance distribution invented respectively.

The mathematical equations governing this transformer circuit are:

$$Z_0(x)=Z_{01} \text{ (a real constant) } x\leq O$$

$$Z_0(x)=Z_{02} \text{ (a real constant) } x\geq O$$

$$Z_0(x)=\frac{Z_{01}+Z_{02}}{2}+\frac{Z_{01}-Z_{02}}{2}\cos\frac{\pi x}{L} O\leq x\leq L$$

where $Z_{01}$ is the characteristic impedance of the sending end, $Z_{02}$ is the characteristic impedance of the receiving end, L is the total length of the transformer, $x$ is the distance variable, and $\pi$ is the conventional geometrical constant of value 3.1416. The above equations state that the characteristic impedances are constant values both in the sending and receiving ends with a gradual variation in between. It is this variation that makes the cosinusoidal matching technique unique.

It can be mathematically demonstrated that a consinusoidal distribution results in a transformer with a significantly smaller reefiction coefficient compared to presently known impedance matching tapers, everything else being equal. The use of the cosinusoidal matching technique may be demonstrated by the following example. Given two coaxial lines of 50-ohm and 150-ohm characteristic impedance, respectively, and the problem is to design a cosinusoidal matching transformer.

The equations become:

$$Z_0(x)=50 \text{ ohms}, x\leq O$$

$$Z_0(x)=150 \text{ ohms}, x\geq L$$

$$Z_0(x)=100-50\cos \pi x/L,\ O\leq x\leq L$$

Now a length of transformer L compatible with bandwidth requirements is chosen, in this case, a value of 9.5 inches.

The characteristic impedance for a coaxial transmission line is given by $$Z_0=\frac{1}{2\pi}\sqrt{\frac{\mu}{\epsilon}}\ln\left(\frac{r_o}{r_i}\right) \text{ ohms}$$

where $\mu$ and $\epsilon$ are the permeability in henrys per meter and permittivity in farads per meter, respectively, of the medium coaxially enclsoed, "1n" is the natural logarithm of and $r_o$ and $r_i$ are the inner radius of the outer conductor and the outer radius of the inner conductor, respectively. For an air dielectric as the propagating medium, the coefficient of the logarithm is simply equal to 60. Two choices are now available in the design: to keep $r_o$ a constant and taper the inner conductor, or to keep $r_i$ a constant and flare the outer conductor.

In actual practice, the given specifications will decide the choice. In this case, the inner conductor is tapered. The equations then become:

$$60\ln\left(\frac{r_o}{r_i}\right)=100-50\cos\frac{\pi x}{9.5} \quad (x \text{ in inches})$$

or $$r_i(x)=r_0 e-\frac{1}{60}\left(100-50\cos\frac{\pi x}{9.5}\right)$$

In other words, the inner conductor's radius obeys this mathematical relation over the distance of 9.5 inches. An actual photograph of this profile is shown in FIG. 3, and an engineering drawing is shown in FIG. 4. The outer conductor with constant radius is removed, but is of standard design compatible with the sending and receiving ends.

A tabulation of radial dimensions along the length of the conductors follows:

TABULATION.—RADIAL DIMENSIONS ALONG CONDUCTORS 10 AND 11 (FIG. 3)

| Stations | Location (Right) From $S_0$, D+000, −003 | Radius (Vertical) From center line, r+000, −001 | Drop from previous Station Height $d$ |
|---|---|---|---|
| $S_0$ | | .188 | |
| $S_1$ | .393 | .187 | .001 |
| $S_2$ | .786 | .183 | .004 |
| $S_3$ | 1.179 | .177 | .006 |
| $S_4$ | 1.572 | .168 | .009 |
| $S_5$ | 1.915 | .158 | .010 |
| $S_6$ | 2.358 | .147 | .011 |
| $S_7$ | ∝2.751 | .136 | .011 |
| $S_8$ | 3.194 | .124 | .012 |
| $S_9$ | 3.537 | .113 | .011 |
| $S_{10}$ | 3.930 | .102 | .011 |
| $S_{11}$ | 4.323 | .092 | .010 |
| $S_{12}$ | 4.716 | .083 | .009 |
| $S_{13}$ | 5.109 | .074 | .009 |
| $S_{14}$ | 5.502 | .067 | .007 |
| $S_{15}$ | 5.895 | .061 | .006 |
| $S_{16}$ | 6.288 | .056 | .005 |
| $S_{17}$ | 6.681 | .051 | .005 |
| $S_{18}$ | 7.074 | .048 | .003 |
| $S_{19}$ | 7.467 | .045 | .003 |
| $S_{20}$ | 7.860 | .043 | .002 |
| $S_{21}$ | 8.253 | .041 | .002 |
| $S_{22}$ | 8.646 | .041 | .000 |
| $S_{23}$ | 9.039 | .040 | .001 |

The above example shows the flexibility of application of the cosinusoidal matching technique. For any combination of variables satisfying the combined equation, $$\frac{1}{2\pi}\sqrt{\frac{\mu}{\epsilon}}\ln\left(\frac{r_0}{r_i}\right)=\frac{Z_{01}+Z_{02}}{2}+\frac{Z_{01}-Z_{02}}{2}\cos\frac{\pi x}{L}$$

superior impedance matching will result.

For given values of mismatched characteristic impedances, $Z_{01}$ and $Z_{02}$, a designer has a choice of electing any of the variables, or combinations of variables on the left side of the above equation in order to satisfy the equality for all values of $x$ over the total transformer length. He could use suitable nonuniform dielectric materials while keeping the geometry constant or he could use variable geometry while keeping the overall dielectric medium the same, or combinations of both, the governing factor being the particular design specifications. Finally, although this matching technique was discovered for RF transmission line circuits, it may also be applied in the fields of acoustical engineering and hydraulics, where wave phenomena dictate impedance matching.

What we claim as new and desire to secure by Letters Patent of the United States is:

1. A coupling matching section for transforming over a wide band of operating frequencies the impedance of one coaxial conductor transmission line to the impedance of another coaxial conductor transmission line, the section having a continuously distributed impedance, comprising a tapered section having conductors $r_0$, the outer radius of the inner conductor, and $r_i$, the inner radius of the outer conductor, which satisfy the equation $$\frac{1}{2\pi}\sqrt{\frac{\mu}{\epsilon}}\ln\left(\frac{r_0}{r_i}\right)=\frac{Z_{01}+Z_{02}}{2}+\frac{Z_{01}-Z_{02}}{2}\cos\frac{\pi x}{L}$$

in which equation the L and $x$ denote, respectively, the length of said tapered section and a point along said section whose impedance characteristic is to be determined, the symbols $\mu$ and $\epsilon$ are the permeability and the permittivity, respectively, of the dielectric propagating medium coaxially enclosed, and the symbols $Z_{01}$ and $Z_{02}$ denote the characteristic impedance of the coaxial transmission line of the sending end and the receiving end, respectively, said tapered section serving to provide a line with a maximum bandwidth for a given length and with a minimum reflection coefficient.

2. An impedance matching section as set forth in claim 1 wherein one of the radii of the tapered section is constant.

References Cited

UNITED STATES PATENTS 2,938,179 5/1960 Unger ---------------- 333—34

OTHER REFERENCES

Gunston et al.: "A Broad-Band Low VSWR H-Plane Waveguide Taper," The Microwave Journal, December 1962, pp. 69–71.

Ragan: "Microwave Transmission Circuits," McGraw-Hill, New York, 1948, pp. 24–25.

Klopfenstein: "A Transmission Line Taper of Improved Design," Proceedings of the IRE, vol. 44, January 1956, pp. 31–35.

HERMAN KARL SAALBACH, *Primary Examiner.*

M. NUSSBAUM, *Assistant Examiner.*